(12) United States Patent
Zientek

(10) Patent No.: US 7,264,199 B2
(45) Date of Patent: Sep. 4, 2007

(54) UNLOADED LIFT OFFSET ROTOR SYSTEM FOR A HELICOPTER

(75) Inventor: Thomas A. Zientek, Drexel Hill, PA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 11/163,414

(22) Filed: Oct. 18, 2005

(65) Prior Publication Data

US 2007/0084962 A1  Apr. 19, 2007

(51) Int. Cl.
*B64C 27/00* (2006.01)

(52) U.S. Cl. .............................. 244/17.11; 244/17.25; 244/17.13; 244/17.23; 416/124; 416/129; 416/120; 416/130; 416/198 R; 416/201 A

(58) Field of Classification Search ............ 244/17.11, 244/17.13, 17.23, 17.25; 416/120, 130, 198 R, 416/201 A See application file for complete search history.

(56) References Cited

U.S. PATENT DOCUMENTS

| 2,404,014 | A | * | 7/1946 | Thornes | 244/17.25 |
| 3,409,249 | A | * | 11/1968 | Bergquist et al. | 244/17.13 |
| 5,240,204 | A | * | 8/1993 | Kunz | 244/6 |
| 6,062,508 | A | * | 5/2000 | Black | 244/8 |

* cited by examiner

*Primary Examiner*—Teri Pham Luu
*Assistant Examiner*—Valentina Xavier
(74) *Attorney, Agent, or Firm*—Ostrager Chong Flaherty & Broitman P.C.

(57) ABSTRACT

A rotor system (12) for a helicopter (10) includes a rotating shaft (82). A gimbaled hub assembly (56) is coupled to the rotating shaft (82). Rotating blades (24) and non-rotating blades (33) are coupled to the gimbaled hub assembly (56). The non-rotating blades (33) provide lift for the helicopter (10) in forward flight unloading the rotating blades. The rotating and non-rotating blades (24, 33) provide equal and opposite rolling moments for lift offset operation.

21 Claims, 5 Drawing Sheets

UNLOADED LIFT OFFSET ROTOR SYSTEM FOR A HELICOPTER

TECHNICAL FIELD

The present invention relates generally to lift offset rotor systems for a helicopter. More particularly, the present invention relates to a system for providing lift offset with reduced loads and vibration for increased vehicle speed.

BACKGROUND OF THE INVENTION

There is an inherent tendency for the retreating blade of a helicopter to stall in forward flight, which limits the forward speed of the helicopter. As helicopter rotors fly in forward flight, there is an asymmetry in lift between the advancing and retreating sides of the rotor that transmit a rolling moment to the helicopter when rigidly connected. Conventional helicopter rotors eliminate the rolling moment through the introduction of flap hinges or a gimbaled mechanism at the root of the rotor blades. The asymmetry in lift causes the blades to flap ("flapping") which then equalizes the lift on the advancing and retreating sides. However flapping, while eliminating steady rolling moments on the airframe, also limits both the maximum speed of the helicopter, as well as its efficiency in forward flight.

Numerous techniques have been devised to increase the maximum speed and forward flight efficiency of a helicopter. One such technique uses a lift offset rotor and is shown in U.S. Pat. No. 3,409,249, by Bergquist et al., entitled "Coaxial Rigid Rotor Helicopter and Method of Flying Same." The U.S. Pat. No. 3,409,249 describes a coaxial rigid rotor concept that introduces the idea of a lift offset rotor. The lift offset rotor was designed to minimize the potential for rotor stall by: 1) employing a first rigid rotor to inhibit the natural tendency of a rotor to equalize the lift between the advancing and retreating sides; and then by 2) balancing the net rolling moment on the helicopter through the use of a second counter-rotating rigid rotor mounted in a coaxial manner with the first rigid rotor. The term "lift offset" refers to the center of lift of the rotor and its migration toward the advancing side as airspeed is increased.

Although the coaxial rigid rotor design was successful in demonstrating the concept of avoiding retreating blade stall, the practical implementation thereof did not realize the increase in efficiency as desired. This lack of performance is a result of the loads and high vibratory moments that are generated by the design. Fundamental to the design is the use of rigid rotors that have little to no flapping associated therewith and thus introduce large fixed system vibratory moments. These moments often result in undesired airframe and rotor stresses. The airframe and rotor stresses prevent the coaxial rigid rotor design from operating with desired lift offset without significant vibration treatment. In addition, the choice of a coaxial rotor system introduces a second rotor hub that, for a light helicopter, increases the parasite drag of the aircraft by nearly 30% over a single main rotor equivalent helicopter. This increase in parasite drag negatively affects or cancels some of the efficiencies gained through the lift offset operation.

Thus, there exists a need for an improved helicopter rotor that provides lift offset, but that does not experience the loading, vibration, and other associated disadvantages as experienced with previous designs.

SUMMARY OF THE INVENTION

The present invention provides a rotor system for a helicopter that includes a rotating shaft. A gimbaled hub assembly is coupled to the rotating shaft. Rotating blades and non-rotating blades are coupled to the gimbaled hub assembly. The non-rotating blades provide lift and rolling moment to the rotor in forward flight. The rotating blades provide lift in hover and both lift and rolling moment in forward flight.

A method of providing forward flight operation on a helicopter is also provided. The method includes pitching rotating blades to provide an angle of attack. The rotating blades are partially unloaded via the non-rotating blades.

The embodiments of the present invention provide several advantages. One such advantage is the lift offset operation and rotor unloading mechanisms, which effectively prevents rotor stall and allows for increased vehicle speed.

Another advantage provided by an embodiment of the present invention is a mechanism that allows for the transfer of lift and moments from the non-rotating wing to the rotating hub of a rotor system. This further enables the above-stated lift offset operation without transmitting any significant vibratory moments to the airframe.

Yet another advantage provided by an embodiment of the present invention is of a mechanism that allows for the tilting of the tip-path-plane of a rotor system to provide yaw control in low speed flight of a tandem rotor helicopter.

Moreover, another advantage of the present invention is at least one fairing to reduce drag on non-rotating portions of a rotor system.

The present invention improves functionality and performance of a helicopter and/or a tandem rotor aircraft.

The present invention itself, together with further objects and attendant advantages, will be best understood by reference to the following detailed description, taken in conjunction with the accompanying drawing.

DETAILED DESCRIPTION

Figure 1:
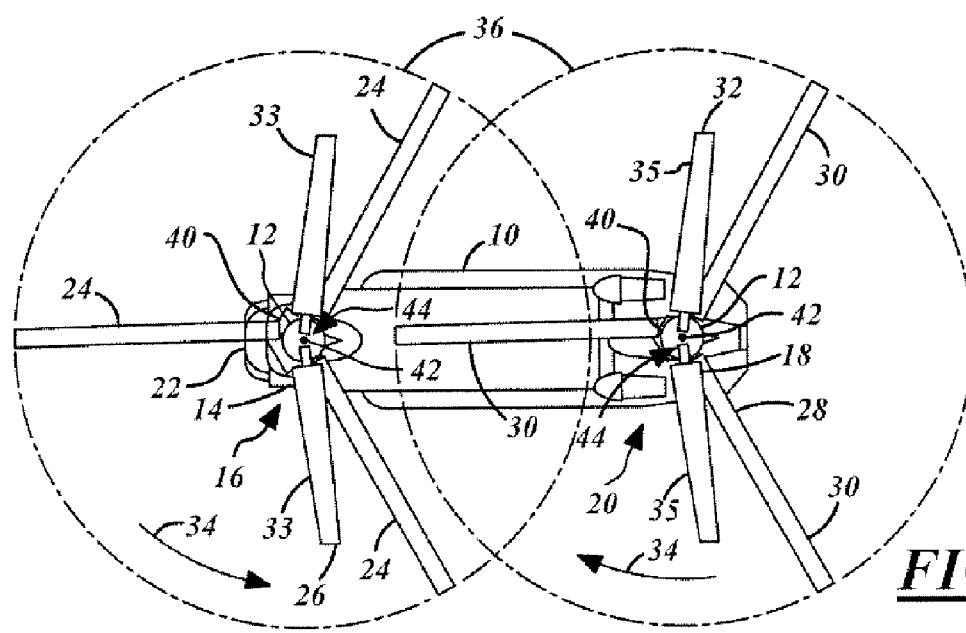
FIG. 1 is a top view of a tandem helicopter incorporating lift offset/unloading rotor systems in accordance with an embodiment of the present invention.

In each of the following figures, the same reference numerals are used to refer to the same components. While the present invention is described with respect to a tandem rotor helicopter system having reduced loading, vibration, and drag characteristics, the present invention may be adapted for various applications and systems known in the art. The present invention is applicable to various helicopter configurations including single main rotor, tandem, side-by-side, tri-rotor, and quad rotor configurations, as well as compound configurations using auxiliary propulsion.

The application of lift offset operation to a tandem rotor helicopter is not straightforward. For example, in using a coaxial rigid rotor design, since the rotors are required to be rigid, the design does not provide the ability to tilt the tip-path-plane of each rotor independent of the helicopter attitude. The capability to tilt the tip-path-plane of each rotor independently is the primary means of control in a tandem rotor helicopter. Yaw control of a tandem rotor helicopter is accomplished through differential lateral tilt of the forward and aft rotors while roll control is accomplished through lateral tilt of the forward and aft rotors in the same direction. In addition, the rotors are tilted forward a few degrees to provide the necessary propulsive force without tilting the whole helicopter. In this manner, a tandem rotor helicopter, that employs articulated rotors, is capable of operating at a fuselage attitude that incurs less drag than a tandem that employs rigid rotors.

One envisioned dual rotor technique of implementing a lift offset rotor design on a tandem rotor helicopter is to mount one rigid rotor forward of a second rigid rotor. However, a number of design features are compromised with this configuration due to the associated disadvantages thereof. First, the fuselage must be stronger and therefore, heavier, than a coaxial rotor implementation (where the rolling moments of each rotor are counteracted within the rotor system). This stiffer, and therefore heavier, structure is the result of the requirement that the fuselage counteract the equal and opposite rolling moments in forward flight to prevent excessive twisting. Secondly, the lack of flapping associated with this technique requires the fuselage to tilt forward to provide the proper propulsive force. This generally incurs greater trim drag than a tandem aircraft equipped with articulated rotors.

Third, without flapping, yaw control becomes difficult to achieve on a tandem helicopter. Yaw control for a tandem helicopter with a rigid rotor may be achieved through a differential collective of the fore and aft rotors. Differential collective, though, also provides pitch control. Therefore, the pitch and yaw degrees of freedom of the helicopter are coupled introducing additional complexity in the required control laws, if at all possible. Fourth, the stated dual rigid rotor implementation transmits high vibratory moments to the airframe, which results in either a reduced fatigue life or a heavier airframe structure to withstand the vibratory environment.

Another technique to achieve lift offset operation in a tandem rotor helicopter configuration is to use two coaxial rigid rotor systems mounted one in front of the other, each rotor system having two rotors. This configuration reacts the forward flight rolling moment of the first rotor system with that of the second rotor system thereby eliminating the moment that needs to be reacted within the fuselage of the dual rotor tandem rotor craft described above. Yaw control is provided through a differential collective within each coaxial rotor system and therefore, yaw control remains uncoupled from the requirements of pitch control. This configuration, however, also has associated disadvantages. The dual coaxial rigid rotor system has four rotors and thus increased complexity and weight. In addition, with additional rotors comes additional hubs and associated drag. As lift offset operation is designed to increase the forward flight efficiency of a helicopter, the introduction of two additional hubs has the potential to increase the parasitic drag of the helicopter by nearly 60% thereby negating the benefits of the lift offset operation. Moreover, the use of coaxial rotor systems in a tandem layout does not allow the tandem aircraft to operate with overlap except with high vertical separations between the fore and aft rotors. This requires greater structure to either provide a longer fuselage for a given rotor radius or a higher aft pylon to place the aft rotors well above the forward rotors. What is more, the vibratory moments are still present in this design.

In all, the application of the concept of lift offset operation using previously known techniques is difficult to implement for a tandem rotor helicopter without compromising many of the inherent benefits of such a helicopter. The present invention provides an improved practical system for achieving lift offset operation on a tandem rotor helicopter. The present invention demonstrates improved efficiencies and does not have the vibration penalties of the prior art. In this manner, the present invention enables significantly greater forward flight speeds by the avoidance of rotor stall and is described in detail below.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "lift offset" refers to the center of lift of a rotor and its migration toward the advancing side as airspeed is increased. Lift offset is usually given in terms of percent blade radius.

Referring now to FIG. 1, a top view of a tandem rotor helicopter 10 incorporating lift offset/unloading rotor systems 12 in accordance with an embodiment of the present invention is shown. The tandem helicopter 10 includes a first lift offset/unloading rotor system 14 that is located in a fore portion 16 of the helicopter 10 and a second lift offset/unloading rotor system 18 that is located in an aft portion 20 of the helicopter 10. The lift offset/unloading rotor systems 12 provide the following features: lift, lift offset, and rotor unloading, as well as other features, which are described in detail below.

The first lift offset/unloading rotor system 14 includes a first rotor 22, having a first set of rotating blades 24, and a first fixed wing 26. The second lift offset/unloading rotor system 18 includes a second rotor 28, having a second set of rotating blades 30, and a second fixed wing 32. The first rotor 22 rotates in an opposite direction as that of the second rotor 28, as designated by arrows 34. The fixed wings 26 and 32 have a first set of non-rotating blades 33 and a second set of non-rotating blades 35, respectively. The fixed wings 26 and 32 counteract the rolling moment generated by the rotors 22 and 28 to enable lift offset operation. The fixed wings 26 and 32 also provide lift, thereby unloading the rotors 22 and 28. The rotors 22 and 28, in the embodiment shown, are mounted vertically below the fixed wings 26 and 32, but may be mounted above the fixed wings 26 and 32. The rotors 22 and 28 have associated discs of rotation 36.

The sizes, shapes, quantity, and mounting configuration of the blades 24, 30, 33, and 35 may vary depending upon the application and associated design requirements. Although two rotors and two fixed wings are shown and each rotor has three blades and each fixed wing has two blades, any number of rotors, wings, and blades and combination thereof may be utilized. Also, although a particular size proportional relationship is shown between the rotating blades 24 and 30 and the non-rotating blades 33 and 35, the blades 24, 30, 33, and 35 are not necessarily to scale and a different size proportional relationship may be used.

The lift offset/unloading rotor systems 12 also may include hub fairings 40 mounted forward of each axis of rotation 42 of each of the rotors 22 and 28. The fairings 40 may be mounted to cover the fixed portions of the lift offset/unloading rotor systems 12. Specifically, the fairings 40 may be used to shield portions of the fixed wings 26 and 32 near the fixed wing roots (best seen in FIGS. 2-5) or in the hub areas 44. The fairings 40 are vertically located at approximately the same level as the fixed wings 26 and 32. The dimensions and orientations of the fairings 40 may vary depending upon the application.

Figure 2:
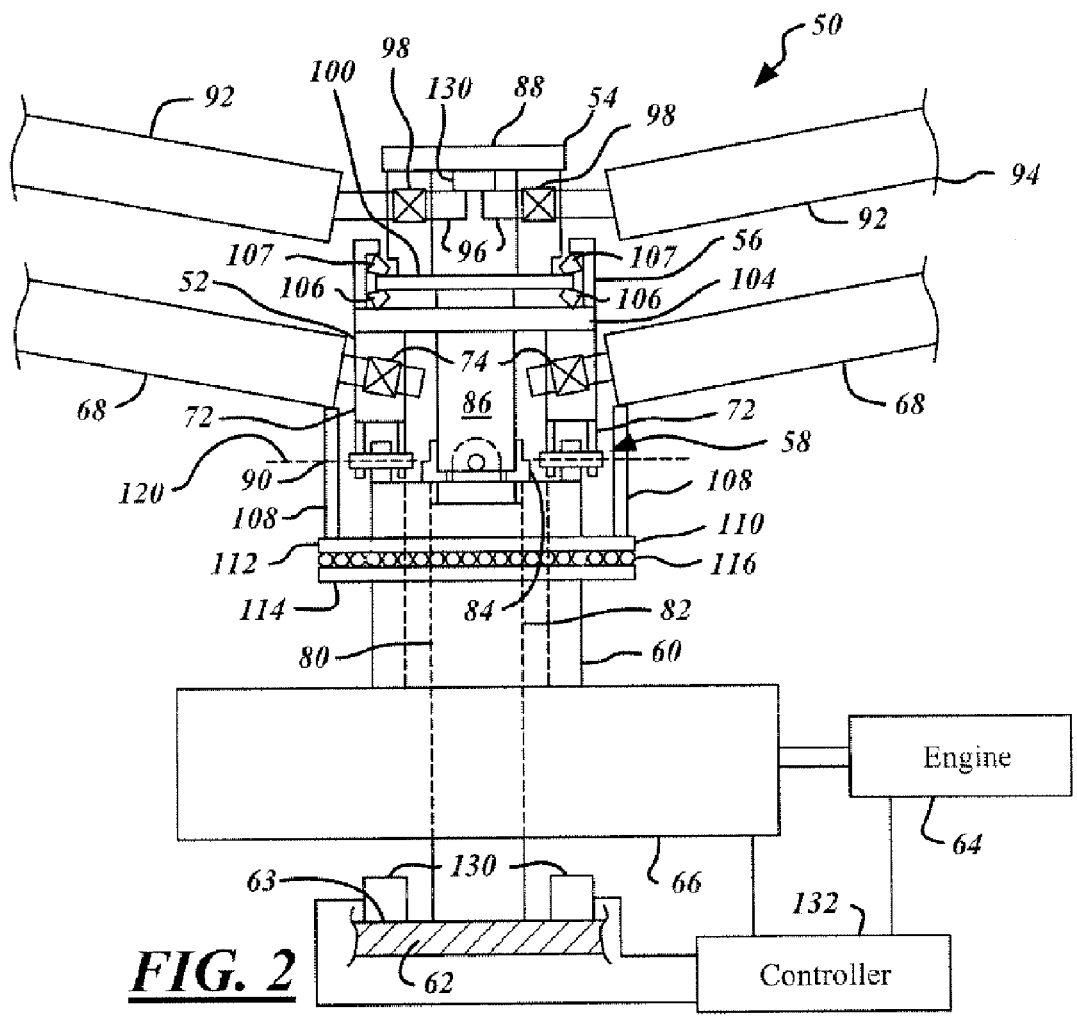
FIG. 2 is a side cross-sectional view of a lift offset/unloading rotor system in accordance with an embodiment of the present invention.

Referring now to FIG. 2, a side cross-sectional view of a lift offset/unloading rotor system 50 in accordance with an embodiment of the present invention is shown. The lift offset/unloading rotor system 50 includes a rotating assembly 52 and a non-rotating assembly 54. Both the rotating and non-rotating assemblies 52 and 54 are coupled to a gimbaled hub assembly 56 having a constant velocity gimbaled or universal joint 58. The lift offset/unloading rotor system 50 enables lift offset and has the operational flexibility associated with articulated rotors.

The rotating assembly 52 includes a rotating shaft 60 that extends from an airframe or fuselage 62 of an aircraft 63. The rotating shaft 60 is coupled to an engine 64 via a transmission 66. Although the engine 64 and the transmission 66 are shown as being external and separate from the airframe 62, the engine 64 and the transmission 66 may be attached and/or internal to the airframe 62. Rotating blades 68 are coupled to the rotating shaft 60 via a lower blade or rotating blade support structure, such as the gimbaled hub assembly 56. The gimbaled hub assembly 56 is mounted to the rotating shaft 60 via a set of universal joints 72 and a first set of pitch bearings 74. The rotating blades 68 have a first set of root shafts 76 that extend within the gimbaled hub assembly 56 and pivot on the pitch bearings 74.

The non-rotating assembly 54 includes a non-rotating shaft assembly 80 that is disposed within and extends through the rotating shaft 60 and the gimbaled hub 56. The non-rotating shaft assembly 80 includes a fixed lower shaft 82, which may be mounted to the fuselage 62 or to vehicle frame (not shown), a center universal joint 84, and a non-rotating upper shaft 86 that is coupled to an upper blade or non-rotating blade support structure 88. The lower shaft 82 is sometime referred to as a "standpipe". The center universal joint 84 is at the same vertical level or is mounted along the same waterline 90 as the set of universal joints 72. Non-rotating blades 92, which together form a fixed wing 94, are coupled to the non-rotating shaft assembly 80 via the non-rotating support structure 88. This allows the non-rotating assembly 54 to accommodate for any tilting motion of the gimbaled hub assembly 56. The non-rotating blades 92 have a second set of root shafts 96 that extend within the non-rotating support structure 88 and pivot on a second set of pitch bearings 98.

The non-rotating wing 94 operates in conjunction with the rotating assembly 52 to provide lift offset. The non-rotating wing 94 also provides lift, thereby unloading the rotating blades 68.

The non-rotating support structure 88 is coupled on the gimbaled hub assembly 56. A tapered roller bearing assembly 100 is disposed between the non-rotating support structure 88 and the gimbaled hub assembly 56 and allows for the transfer of moments therebetween. The tapered roller bearing assembly 100 includes an upper roller plate 102 and a lower roller plate 104. The lower plate 102 rotates relative to the upper plate 104 via tapered roller bearings 106 "sandwiched" therebetween and tapered roller bearings 107, which are coupled between the upper roller plate 104 and an enclosure member 109. The enclosure member 109 may be separate or integrally formed with the lower plate 102 and contains the bearings 106 and 107.

Each of the blades 68 is coupled to pitch linkages 108, pitch arms (not shown), and to a swashplate assembly 110. Pitch links 108 may be coupled to the rotating blade root shafts 76 within or exterior to the rotating shaft 60 or directly to the rotating blades 68. Pitch arms (not shown), for the non-rotating blades 92, are attached to linear actuators (not shown) and may be coupled to the non-rotating root shafts 96 within or exterior to the upper support structure 88 or directly to the non-rotating blades 92. The swashplate assembly 110 includes a rotating swashplate 112, a non-rotating swashplate 114, and swashplate bearings 116 sandwiched therebetween. The pitch links 108 are coupled to the rotating swashplate 112. The non-rotating pitch actuators may be coupled to the non-rotating swashplate 114 or to some other non-rotating structure.

The stated actuators, pitch linkages, pitch arms, and swashplate assembly allow for independent adjustment of the tilt of the non-rotating and rotating blades 68 and 92. The ability to adjust the pitch of the non-rotating blades 92 allows for the wing 94 to provide lift in forward flight by increasing the pitch of each of the blades 92 simultaneously. This simultaneous increase in pitch allows for the rotating blades 68 to be unloaded. In addition, when two non-rotating blades are used, the incidence of a first non-rotating blade may be increased and the incidence of a second non-rotating blade may be decreased providing a rolling moment. This rolling moment may be used to counteract the naturally occurring rolling moment created by the rotating blades 68.

The tip-path-plane 120 of the lift offset/unloading rotor system 50 is parallel to the waterline 90 and may be tilted in response to the application of cyclic pitch in the flight modes of the corresponding aircraft 64.

The non-rotating pitch arms stated above may be coupled to actuators 130 for blade pitch/trim adjustment. The connection between the non-rotating pitch arms and the actuators 130 is not shown. Any suitable linear actuators known in the art may be used. A controller 132 is coupled to each of the actuators 130 and adjusts the pitch of the blades 68 and 92 accordingly through the flight envelope of the aircraft 64 and as flight conditions dictate. The incidence of the non-rotating blades 92 are coordinated with the application of rotor longitudinal cyclic and airspeed in order to maintain the proper amounts of lift and rolling moment. The pitch actuators 130 associated with the non-rotating blades 92 may be coupled directly on or within the non-rotating support structure 88 or elsewhere on the aircraft 64. The pitch actuators 130 may receive control signals via wires (not shown) or wireless communication extending through the standpipe 82 to the controller 132.

The controller 132 may be microprocessor based such as a computer having a central processing unit, memory (RAM and/or ROM), and associated input and output buses. The controller 132 may be an application-specific integrated circuit or may be formed of other logic devices known in the art. The controller may be a portion of a central vehicle main control unit, an interactive vehicle dynamics module, a main safety controller, combined into a single integrated controller, or be a stand-alone controller as shown.

Figure 3:
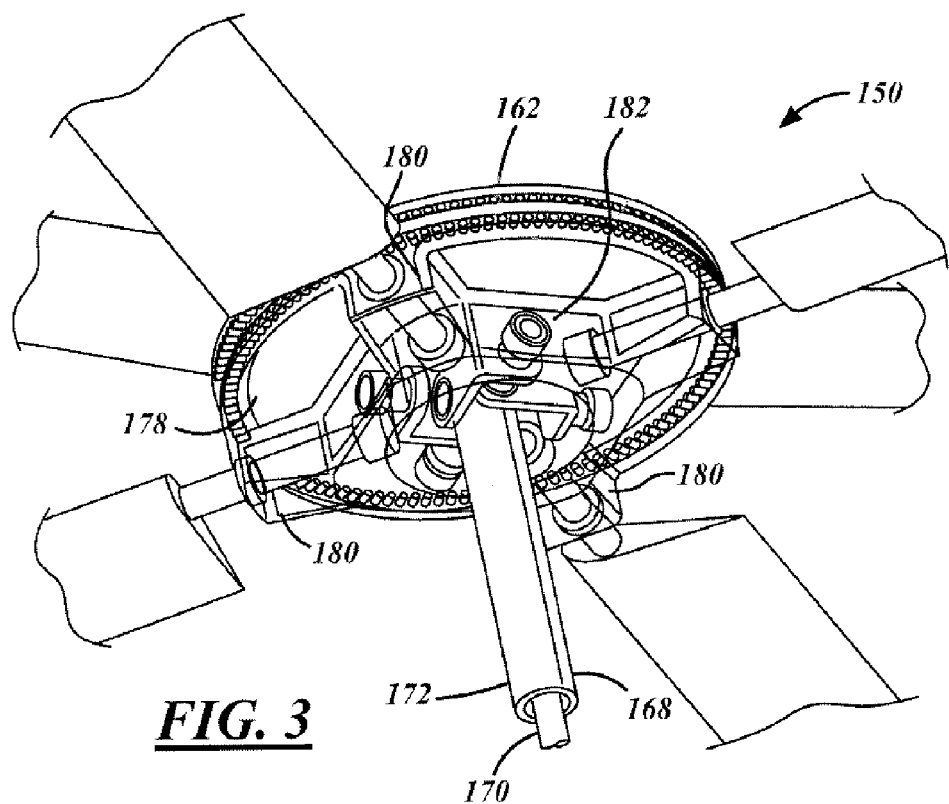
FIG. 3 is a bottom perspective view of a lift offset/unloading rotor system in accordance with another embodiment of the present invention.
Figure 4:
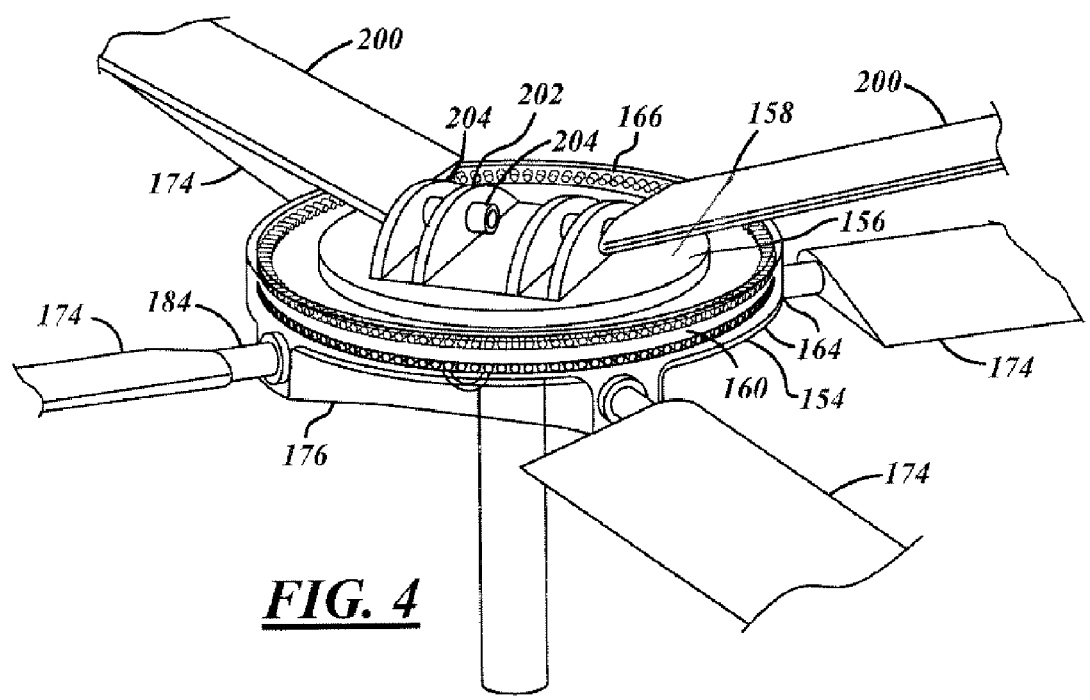
FIG. 4 is a top perspective view of the lift offset/unloading rotor system of FIG. 3.
Figure 5:
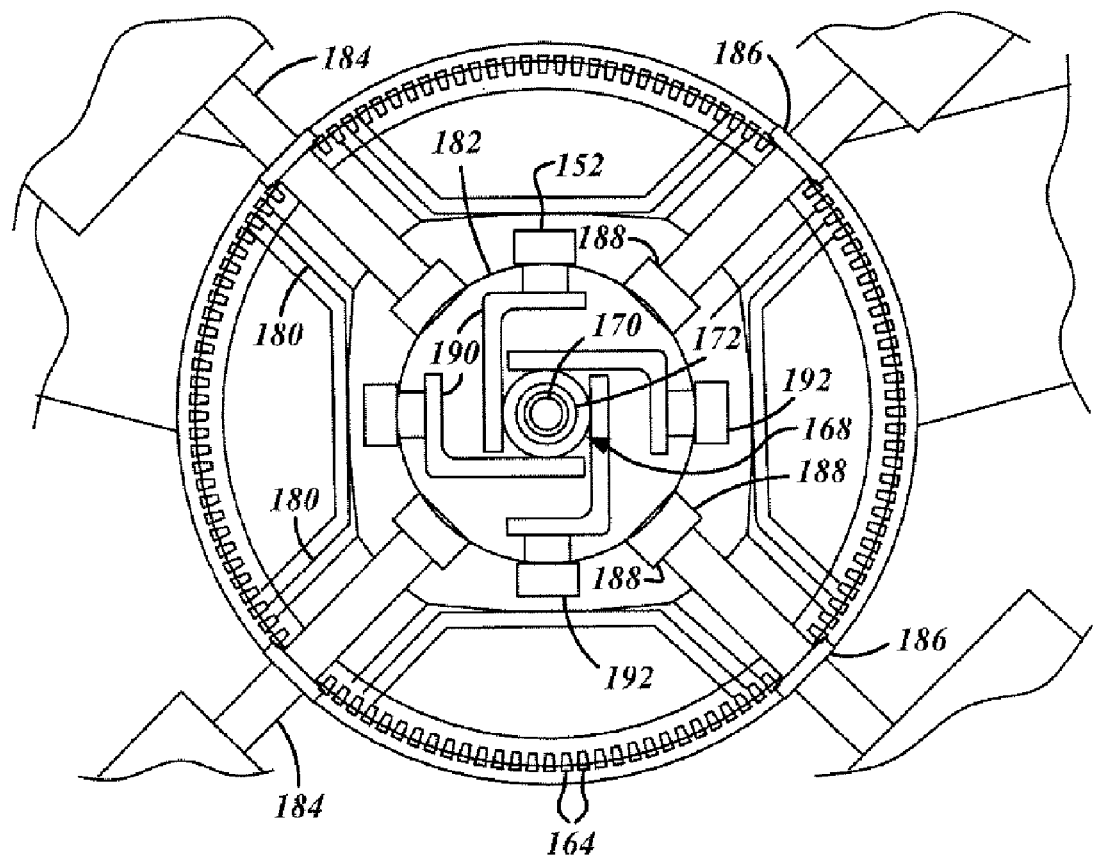
FIG. 5 is a bottom close-up view of a gimbaling hub assembly in accordance with another embodiment of the present invention.

Referring now to FIGS. 3-5, a bottom perspective view and a top perspective view of a lift offset/unloading rotor system 150 and a bottom close-up view of a gimbaling hub assembly 152 contained therein are shown in accordance with another embodiment of the present invention. The lift offset/unloading rotor system 150 is similar to the lift offset/unloading system 50 and thus also includes a rotating assembly 154 and a non-rotating assembly 156. Both the rotating and non-rotating assemblies 154 and 156 are coupled to the gimbaled hub assembly 152. The gimbaled hub assembly 152 includes a non-rotating support plate 158, a non-rotating center plate 160, and a rotating support plate 162. The rotating support plate 162 wraps around the center plate 160. The plates 160, and 162 are separated via two series of tapered roller bearings 164 that are disposed therebetween along a circumferential periphery 166 of the gimbaled hub assembly 152.

The rotating assembly 154 includes a hollow rotating shaft 168 that is connected to the rotating plate 162 through drive links 190. Rotating blades 174 are coupled to the rotating assembly 154 through a rotating blade root support housing 176. The housing 176 is coupled to a lower side 178 of the rotating plate 162 and includes blade root support members 180 and a center bearing support element 182. Blade root shafts 184 of the rotating blades 174 extend within the root support members 180 through outer root bearings 186 and are coupled to the center element 182 via root end bearings 188. The rotating blades 174 pivot on the outer root bearings 186 and the root end bearings 188. The center element 182 is coupled to the rotating shaft 168 via "L"-shaped constant velocity links 190. The links 190 are coupled to the center element 182 via gimbaled bearings 192, which allow the gimbaled hub assembly 152 to pivot in multiple directions thereon.

The non-rotating assembly 156 includes the non-rotating shaft 170, which is rigidly coupled to the non-rotating plate 158. Not visible is a universal joint mounted at the tip of the non-rotating shaft 170 that connects to the non-rotating plate 158 to prevent the non-rotating assembly 156 from spinning yet allowing it to tilt with the rotating hub assembly 152. Non-rotating blades 200 are coupled to the non-rotating plate 158 via a root support base 202, mounted directly thereon. The non-rotating blades 200 pivot relative to the support base 202 via non-rotating blade root bearings 204 coupled to the root support base 202. Pitch of the non-rotating blades 200 may be adjusted via pitch actuators (not shown) mounted directly on the support base 202. A fairing (not shown) may be installed around the support base 202 to minimize drag.

Of course each of the blades 174 and 200 may be coupled to pitch linkages, pitch arms, and to a swashplate assembly as similarly described above. The pitch arms may be coupled to various locations along the root shafts of each of the blades 174 and 200 or directly thereto.

Figure 6:
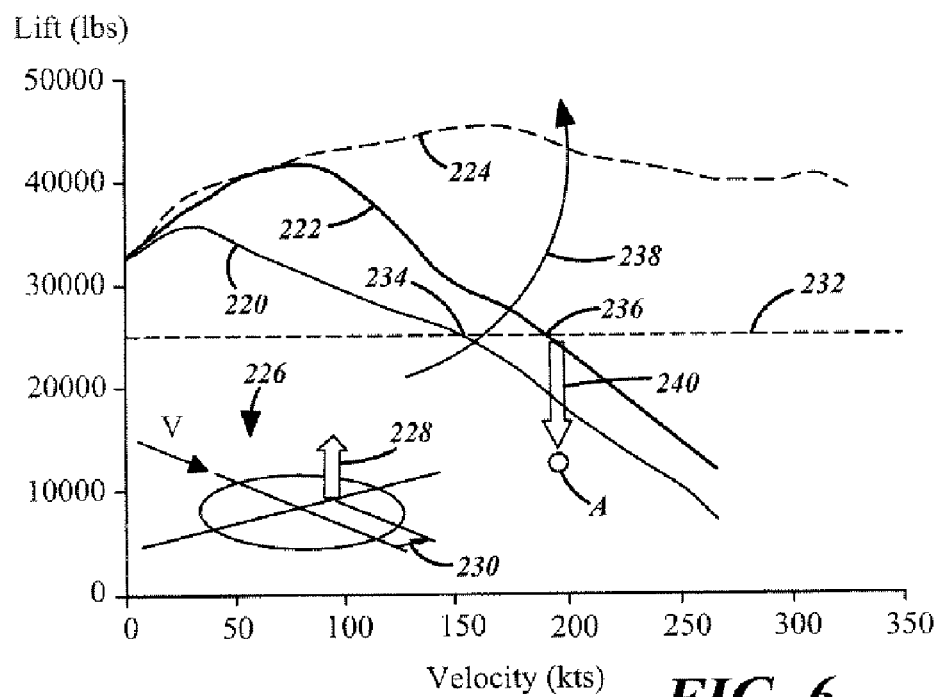
FIG. 6 is a lift offset comparison graph.

Referring now to FIG. 6, a lift offset comparison graph is shown. The lift offset graph provides curves for one to compare the maximum possible lift provided by an articulated rotor with no lift offset, a rigid rotor with approximately 15% lift offset, and a rigid rotor having approximately 40% lift offset; the curves are labeled 220, 222, and 224, respectively. A diagram 226 is shown in the lower left corner of the graph illustrating percentage lift offset where V is aircraft velocity and R is rotor radius. Center of lift is represented by arrow 228 and percentage of lift offset is shown by arrow 230. A 1 g force of gravity level flight line 232 is provided. The points 234 and 236, at which the curves 220 and 222 intersect the 1 g flight line 232, represent maximum flight speeds of a helicopter having the associated design characteristics to provide the lift offset associated therewith. Notice that curve 224 does not intersect the 1 g flight line 232 and thus an aircraft having such design characteristics to provide the lift offset stated is not speed limited due to rotor stall.

Also, in general, the maximum rotor lift that a helicopter can achieve is a function of the percentage of lift offset provided. Notice that an aircraft having lift offset characteristics, represented by curve 224, provides improved lift over that of those having characteristics, represented by curves 220 and 222.

The present invention in utilizing a non-rotating wing also unloads the associated rotor in forward flight, which shifts the operating conditions of the rotor away from the stall boundary point, represented by point A in FIG. 6, of a conventionally articulated rotor. The unloading is represented by trend arrow 240. Utilization of a non-rotating wing, as described above, also generates a rolling moment that moves the stall boundary of the rotor to greater thrust values, as depicted by trend arrow 238. The non-rotating wing thus provides two mechanisms that simultaneously increase a maximum rotor operating speed. As such, the present invention provides lift versus velocity characteristics that closely match that of the curve 224.

Unloading allows a more efficient structural design for a given target lift offset percentage. Without unloading, for example, a 30 ft radius lift offset rotor that targets 40% lift offset must withstand a steady rolling moment of approximately 300,000 ft-lb for a 25,000 lb vehicle. An identical rotor that is unloaded by 50% can achieve 40% lift offset with structure designed to withstand a steady rolling moment of 150,000 ft-lb.

Figure 7:
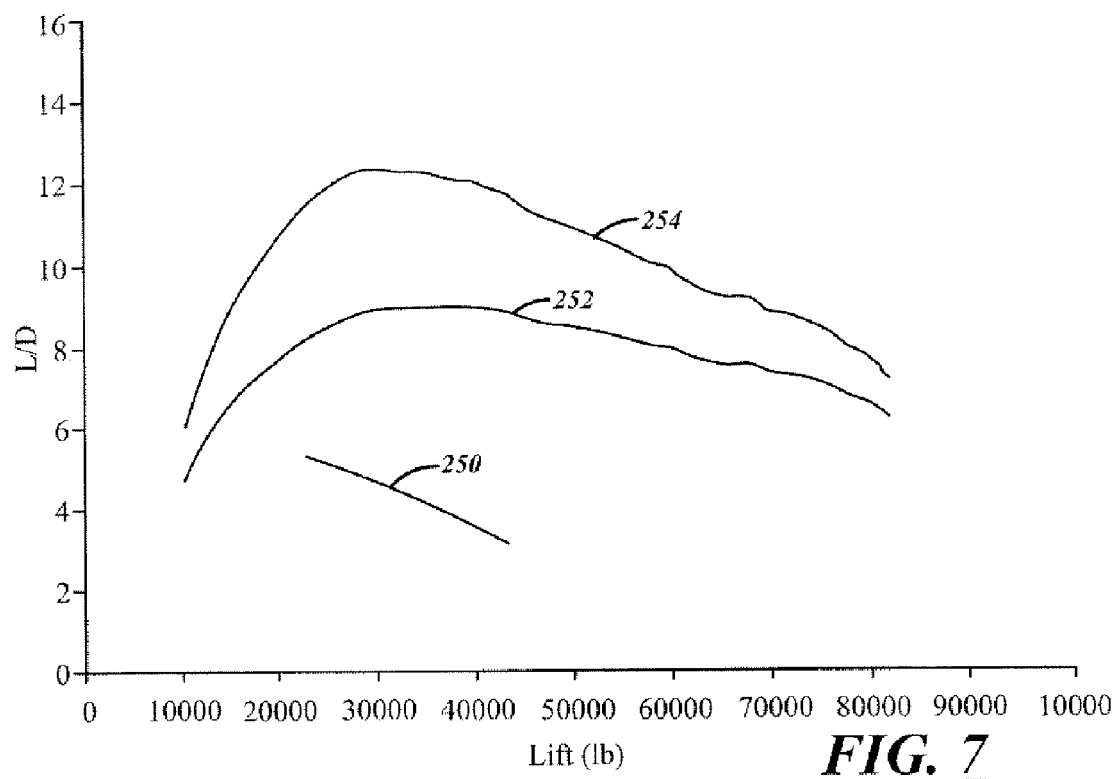
FIG. 7 is a rotor and lifting system efficiency comparison graph.

Referring now to FIG. 7, a rotor and lifting system efficiency comparison graph is shown. The rotor and lifting graph provides curves 250, 252, and 254 for the rotor lift-to-drag (L/D) ratios of a conventional rotor 250 and of a lift offset rotor having 40% lift offset 254. The curve 252 represents approximately the total lift-to-drag ratio of the lift offset rotor 254 when the drag of the wing is included. The curves represent L/D estimates for the stated helicopter designs operating at 210 kts forward speed without providing any propulsive force (X=0). The conventional rotor has a peak L/D of approximately 5.5 and is unable to lift greater than approximately 43,000 lbs. Operation of the same rotor with 40% lift offset increases the efficiency of the rotor to a peak L/D of approximately 12.5 and is able to lift in excess of 80,000 lbs for the same flight condition of 210 kts. When drag of the fixed wing of the stated embodiment is accounted for, the present invention has a peak L/D of approximately 9.

Figure 8:
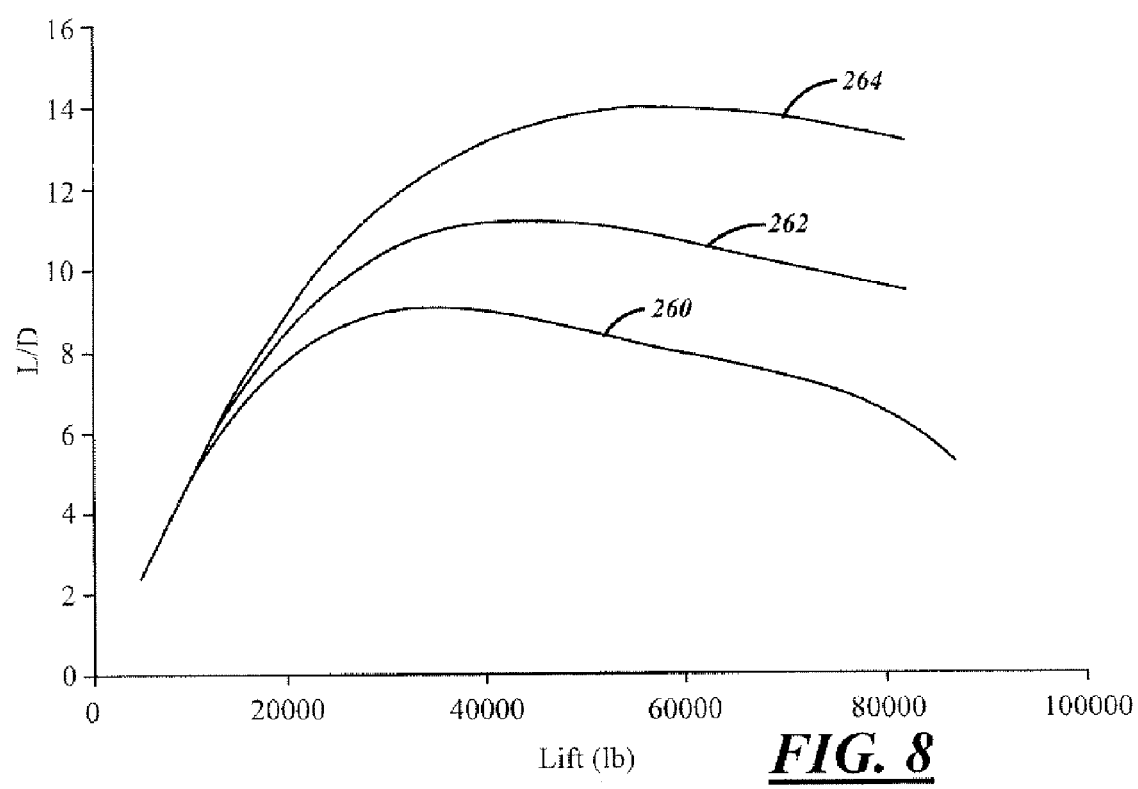
FIG. 8 is a rotor unloading comparison graph.

Referring now to FIG. 8, a rotor unloading comparison graph is shown. The rotor unloading graph provides curves 260, 262, and 264 for the comparison of the L/D for a lifting system exhibiting no unloading, for a lifting system exhibiting 20% unloading, and for a lifting system exhibiting 40% unloading, respectively. Curve 260 is the same as curve 252. Adjusting the pitch of the non-rotating blades alters the percentage of unloading.

By unloading a rotor by 20% and operating with 40% lift offset one can increase the peak L/D from 9 to approximately 11. Likewise, by unloading a rotor by 40% and operating with 40% lift offset one can increase the peak L/D up to approximately 14. The above-stated percentages are for example purposes only and may vary.

Figure 9:
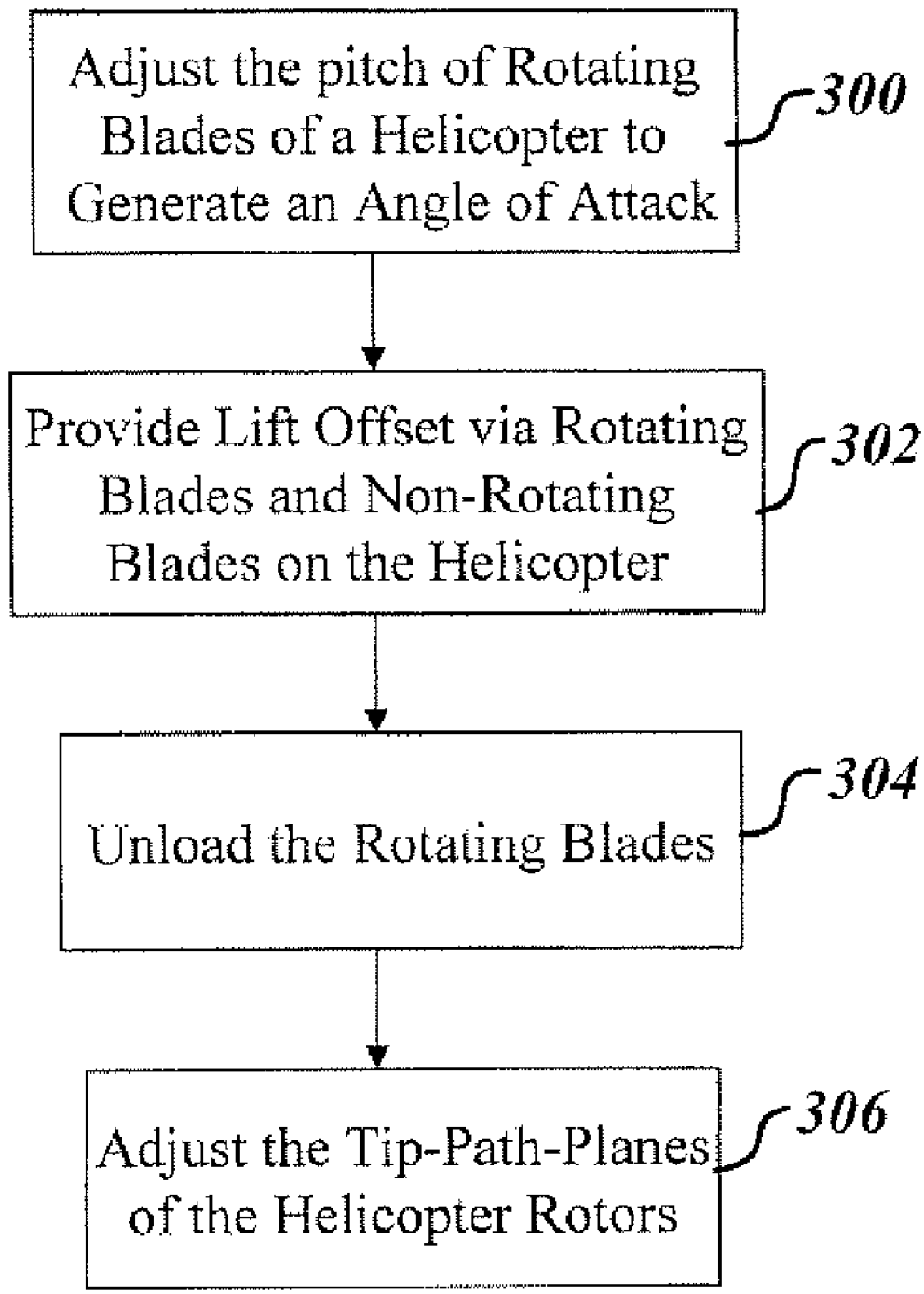
FIG. 9 is a logic flow diagram illustrating a method of providing forward flight operation on a helicopter in accordance with an embodiment of the present invention.

Referring now to FIG. 9, a logic flow diagram illustrating a method of providing forward flight operation on a helicopter having one or more rotors, such as the rotors 22 and 28, in accordance with an embodiment of the present invention is shown.

In step 300, rotating blades, such as the blades 24 and 30, of the helicopter are pivoted, or in other words, the pitch thereof is adjusted to provide a local blade angle of attack to generate lift in forward flight. This is performed similarly as that on a traditional articulated rotor helicopter.

In step 302, the non-rotating blades, such as the blades 33 and 35, enable the rotating blades to operate with lift offset. Pitch of the non-rotating blades is adjusted to provide rolling moments that counteract the rolling moments generated by the rotating blades. The pitch of the non-rotating blades may be determined via a controller, such as the controller 132.

In step 304, the rotating blades are unloaded. The non-rotating blades provide lift, which unloads the rotating blades. In one embodiment of the present invention steps 302 and 304 are performed simultaneously. In steps 302 and 304, lift and moments are transferred between the non-rotating blades and the rotating blades via a tapered roller bearing assembly, such as the tapered roller bearing assembly 100 and reacted within the hub structure.

In step 306, the tip-path-planes of the rotors are adjusted with cyclic pitch to provide control and propulsion, as necessary. The tip-path-planes may be systematically adjusted through the provision of a gimbaled hub, such as the hubs 56 and 152, or may be adjusted via a controller and one or more associated actuators (not shown). A sample controller that may be used is the controller 132.

The above-described steps are also meant to be illustrative examples; the steps may be performed sequentially, synchronously, simultaneously, or in a different order depending upon the application.

The ability of the present invention to tilt its tip-path-plane independently of fuselage attitude allows for its application to a tandem rotor helicopter without modifying the control laws of that helicopter significantly. Yaw control, roll control, and propulsive force are provided in a similar manner as that of existing tandem rotor helicopters. The present invention minimizes the tendency of tandem rotors to flap up at the front of a rotor disc as a result of the asymmetry in the flow associated with forward flight. In addition, the rotor system of the present invention allows for flapping in response to gusts thereby having the beneficial gust response of an articulated rotor system.

The gimbaled hub of the present invention substantially eliminates the vibratory moments that would normally be transmitted to the airframe in a traditional lift offset rotor design. Thus, the fixed system vibrations resulting from the vibratory rolling moments of traditional systems are not present with the present invention.

The present invention provides a more practical system of achieving lift offset operation for a tandem rotor helicopter. The present invention demonstrates greater efficiencies and does not demonstrate any of the vibration penalties of prior art systems. In this manner, an efficient rotor system is provided which enables significantly greater forward flight speeds by the avoidance of rotor stall through two fundamental mechanisms, specifically unloading and lift offset operation.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A rotor system for a helicopter comprising:
   a rotating shaft;
   at least one gimbaled hub assembly coupled to said rotating shaft;
   a plurality of rotating blades coupled to said at least one gimbaled hub assembly; and
   a plurality of non-rotating blades coupled to said at least one gimbaled hub assembly and providing lift for the helicopter;
   said plurality of non-rotating blades providing rolling moment to said at least one gimbaled hub assembly.

2. A system as in claim 1 further comprising a non-rotating shaft coupled to said rotating shaft and said plurality of non-rotating blades.

3. A system as in claim 2 wherein said non-rotating shaft extends within said rotating shaft.

4. A system as in claim 1 wherein said plurality of non-rotating blades are vertically coupled above said plurality of rotating blades.

5. A system as in claim 1 wherein said plurality of non-rotating blades are pitch adjustable.

6. A system as in claim 1 wherein said plurality of rotating blades are pitch adjustable.

7. A system as in claim 1 wherein said plurality of non-rotating blades form a fixed wing.

8. A system as in claim 1 further comprising a set of bearings coupled between said plurality of non-rotating blades and said plurality of rotating blades for moment transfer therebetween.

9. A system as in claim 1 further comprising at least one swashplate coupled to said rotating shaft and said plurality of rotating blades.

10. A system as in claim 1 further comprising at least one pitch actuator coupled to said plurality of non-rotating blades.

11. A system as in claim 1 wherein said at least one gimbaled hub assembly comprises a plurality of universal joints coupled to said plurality of non-rotating blades and said plurality of rotating blades.

12. A helicopter comprising:
   a fuselage;
   at least one engine; and
   at least one rotor system comprising;
   a rotating shaft extending from said fuselage and coupled to said engine;
   at least one gimbaled hub assembly coupled to said rotating shaft;
   a plurality of rotating blades coupled to said at least one gimbaled hub assembly; and
   at least one non-rotating wing coupled to said at least one gimbaled hub assembly and providing lift and counteracting moments generated by said plurality of rotating blades.

13. A helicopter as in claim 12 wherein said at least one non-rotating wing is pitch adjustable.

14. A helicopter as in claim 12 wherein said at least one non-rotating wing comprises a plurality of blades.

15. A helicopter as in claim 12 further comprising:
   a non-rotating blade support structure coupled to said at least one non-rotating wing;

a tapered roller bearing assembly coupled to said non-rotating blade support structure; and a rotating blade support structure coupled to said plurality of rotating blades and said tapered roller bearing assembly.

16. A helicopter as in claim 12 further comprising a pitch actuator coupled to said non-rotating blade support structure and adjusting pitch of said at least one non-rotating wing.

17. A helicopter as in claim 12 further comprising a plurality of constant velocity links coupled between said rotating shaft and said plurality of rotating blades.

18. A helicopter as in claim 17 further comprising:

a rotating blade root support housing coupled between said plurality of constant velocity links and said rotating shaft; and a plurality of gimbal bearings coupled between said plurality of constant velocity links and said support housing.

19. A helicopter as in claim 12 wherein said at least one rotor system comprises:

a first rotor system; and a second rotor system.

20. A helicopter as in claim 12 wherein said at least one rotor system comprises:

a first rotor system comprising:

a first rotating shaft extending from said fuselage;

a first gimbaled hub assembly coupled to said first rotating shaft;

a first non-rotating wing coupled to said first gimbaled hub assembly; and a first plurality of rotating blades coupled to said first gimbaled hub assembly; and a second rotor system comprising:

a second rotating shaft extending from said fuselage;

a second gimbaled hub assembly coupled to said second rotating shaft;

a second non-rotating wing coupled to said second gimbaled hub assembly; and a second plurality of rotating blades coupled to said second gimbaled hub assembly.

21. A system as in claim 12 further comprising at least one hub fairing covering a non-rotating portion of the at least one rotor system.

* * * * *